(12) United States Patent
Sangala et al.

(10) Patent No.: US 11,698,843 B2
(45) Date of Patent: *Jul. 11, 2023

(54) AUTOMATING THE FAILOVER OF A RELATIONAL DATABASE IN A CLOUD COMPUTING ENVIRONMENT

(71) Applicant: Capital One Services, LLC, McLean, VA (US)

(72) Inventors: Kasi Reddy Sangala, Plano, TX (US); Shah Sidi, Plano, TX (US); Sampath Kumar Kasilingam, Frisco, TX (US); Paul Ly, Wylie, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,802

(22) Filed: Jan. 14, 2022

(65) Prior Publication Data

US 2022/0138060 A1 May 5, 2022

Related U.S. Application Data

(63) Continuation of application No. 16/866,926, filed on May 5, 2020, now Pat. No. 11,249,867.

(51) Int. Cl.
*G06F 11/00* (2006.01)
*G06F 11/20* (2006.01)
(Continued)

(52) U.S. Cl.
CPC .......... *G06F 11/2025* (2013.01); *G06F 9/547* (2013.01); *G06F 11/2056* (2013.01);
(Continued)

(58) Field of Classification Search
CPC ............ G06F 11/2025; G06F 11/2056; G06F 11/327; G06F 11/3409; G06F 11/0709;
(Continued)

(56) References Cited

U.S. PATENT DOCUMENTS 7,694,012 B1 4/2010 Harper et al.
9,219,639 B2 * 12/2015 Jain ...................... G06F 11/3409
(Continued)

OTHER PUBLICATIONS

Baron J; Kotecha S., Storage options in the aws cloud. Amazon Web Services, Tech. Rep., Oct. 2013., Washington DC.

*Primary Examiner* — Joseph D Manoskey
(74) *Attorney, Agent, or Firm* — Sterne, Kessler, Goldstein & Fox P.L.L.C.

(57) ABSTRACT

Described herein is a method, system, and non-transitory computer readable medium for helping customers in accessing data through an application from a replica database, detecting whether the replica database, zone of availability of the replica database, or geographical region encompassing the zone of availability is experiencing an outage or other failure, and re-routing traffic to a backup replica database accordingly. To assess the status of the database, metrics are pushed in a secure manner from a private subnet to a public-facing monitoring agent, achieving a clear segregation of private subnet and public facing components. Further, circuit-breaker logic is included for preventing failure during updating DNS addresses during the re-routing process.

20 Claims, 6 Drawing Sheets

(51) Int. Cl.
*G06F 9/54* (2006.01)
*G06F 11/34* (2006.01)
*G06F 11/32* (2006.01)

(52) U.S. Cl.
CPC ........ *G06F 11/327* (2013.01); *G06F 11/3409* (2013.01); *G06F 2201/80* (2013.01); *G06F 2201/81* (2013.01)

(58) Field of Classification Search
CPC .. G06F 11/202; G06F 11/203; G06F 11/2053; G06F 9/547; G06F 2201/80; G06F 2201/81
See application file for complete search history.

(56) References Cited

U.S. PATENT DOCUMENTS

| | | |
|---|---|---|
| 2011/0099420 A1* | 4/2011 | MacDonald McAlister ................ G06F 11/1451 714/6.32 |
| 2015/0254150 A1 | 9/2015 | Gordon et al. |
| 2016/0092322 A1 | 3/2016 | Nosov et al. |
| 2017/0286518 A1 | 10/2017 | Horowitz et al. |
| 2018/0067822 A1 | 3/2018 | McAlister et al. |
| 2018/0239677 A1 | 8/2018 | Chen et al. |
| 2018/0314750 A1 | 11/2018 | Merriman et al. |
| 2020/0183794 A1 | 6/2020 | Dwarampudi et al. |
| 2021/0349795 A1 | 11/2021 | Sangala et al. |
| 2022/0156164 A1* | 5/2022 | Gunjikar ............ G06F 11/2056 |

* cited by examiner

AUTOMATING THE FAILOVER OF A RELATIONAL DATABASE IN A CLOUD COMPUTING ENVIRONMENT

CROSS-REFERENCE TO RELATED APPLICATIONS

This is a continuation application of U.S. Utility patent application Ser. No. 16/866,926, filed May 5, 2020, the contents of which are incorporated herein by reference in their entirety.

BACKGROUND

In today's world, customer experience is an important aspect for any business across the world. With increasing competition, businesses have started to focus on improving the experience for customers as a way to distinguish their services. With increasing adoption of cloud computing environments, in providing a high level of customer service, it is imperative for business applications to be globally available for various customers across different regions (i.e. deploying applications in a single cloud-computing environment across multiple geographical regions). In making applications globally available in such a manner, e.g., in a single cloud computing environment across multiple geographical regions, data center hops between said geographical regions leads to slow down of loading times for customers, and results in decreased performance.

A further issue is disaster recovery. In many applications that are globally available, if an application in one region is experiencing failure issues, the traffic cannot be routed to a healthy application in a different region. This routing inability also leads to time lost for the customer until a particular region's problems are fixed. To complicate this issue, because different layers of the application may be private and not public-facing, any failure occurring, e.g., in the private layer of the application, may not be able to be detected by a module in the public layer of the application. For example, if an application architecture entails using public subnets for web servers, private subnets for application servers, and database subnets for databases, checking on the database through a public TCP/HTTP endpoint in the case of a data failure is problematic. For instance, if the servers doing the checking are located in the public internet, through associated IP range hacking, etc., hackers would be able to access the database or API deployed in private or database subnets. Allowing such access poses a large risk to businesses because of security implications, including hacking, money laundering, stealing of intellectual property, theft of important company documents and data, among others.

Finally, changes in the domain naming system (DNS) is another related issue linked to disaster recovery. In resolving IP addresses to host names, when traffic is being re-routed, a DNS service takes a substantial time to change records (e.g. where changed DNS records may result from re-routing traffic from one server to another with a different IP address in the event of a system outage) into name servers globally. During that time, any application trying to read such a name may not get the updated value, which may lead to problems like connecting to an IP address which does not exist.

All of these problems, among others, lower the level of customer service and significantly diminish customer experience for such business applications.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, apparatus, device, method and/or computer program product embodiments, and/or combinations and sub-combinations thereof, for the automating of a failover for continuing to serve read traffic in the case of a database failure, zone of availability failure, or regional failure, and for achieving higher read throughputs.

The embodiments described herein utilize a public-facing alarm developed based on metrics assessed in private or database subnets, so as to represent the status of system components within the private or database subnets safely and securely to another checking request from an entity on a public subnet. In this manner, a database failure, or zone of availability or regional failure can be assessed in a highly secure manner, and appropriate action may be taken to re-route traffic to a different zone of availability or region.

Figure 1:
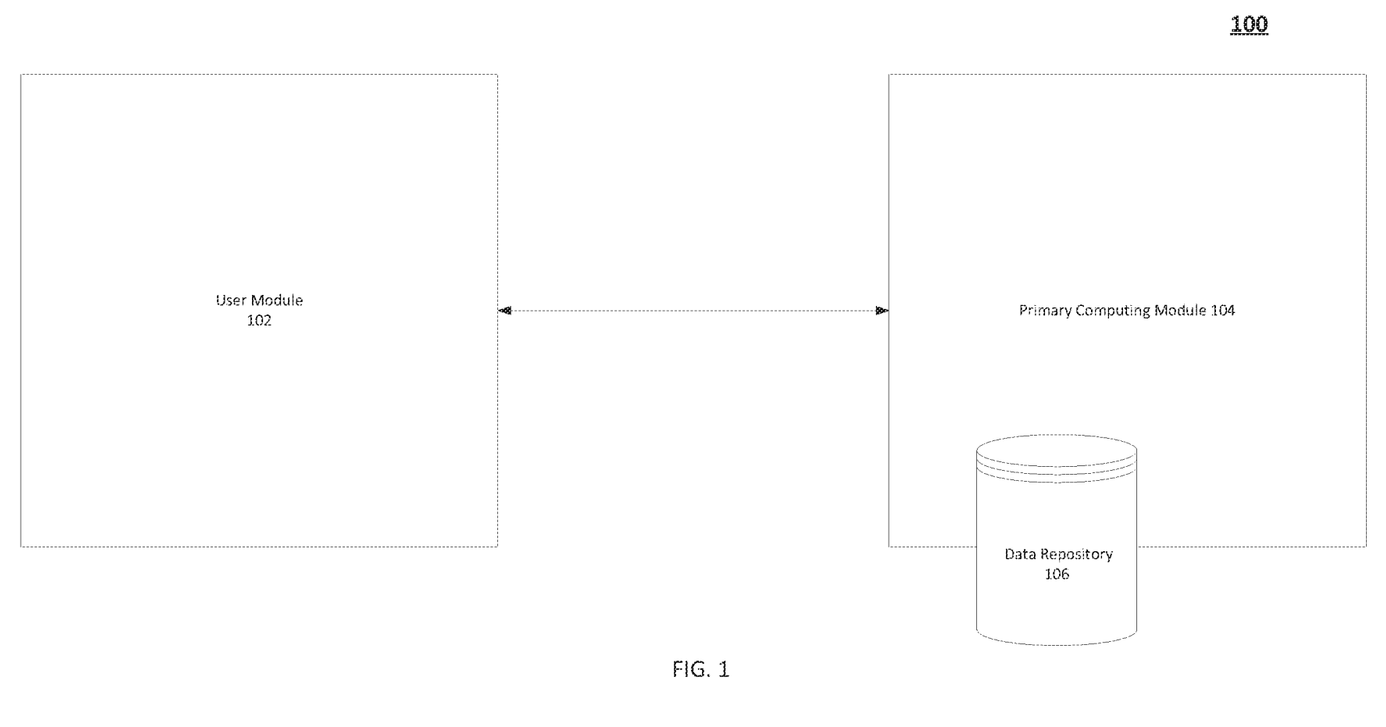
FIG. 1 is a block diagram of an example embodiment where a user module can read information from the data repository of a primary computing module.
Figure 6:
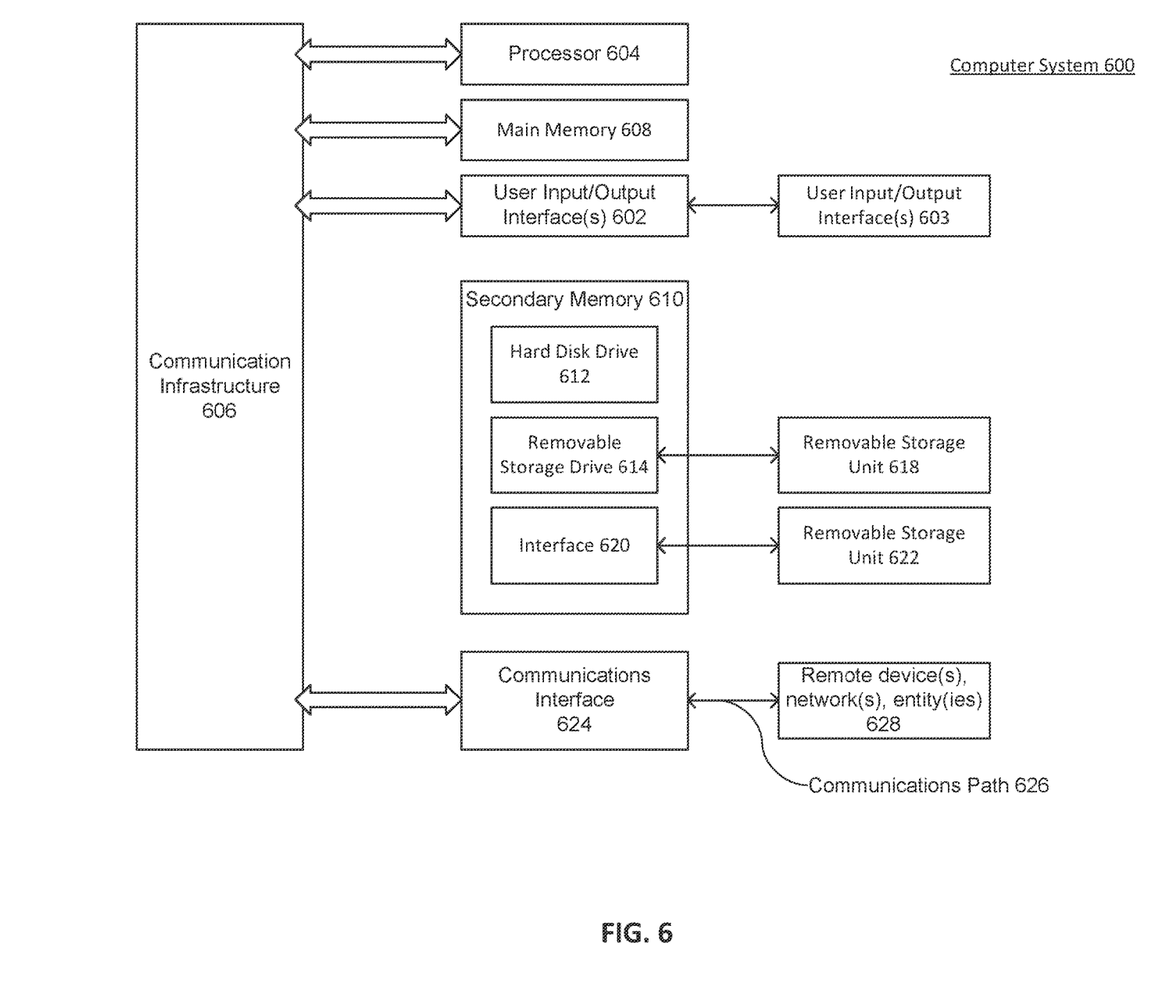
FIG. 6 is a block diagram of example components of the underlying structure of any of the systems presented in the following embodiments.

FIG. 1 is a block diagram illustrating the system arrangement for a data-transfer environment 100 according to an embodiment. Data-transfer environment 100 shows the interaction between an application of a user module 102, which may access the data repository 106 of a primary computing module 104. The data repository 106 may be present on a computing system 600 of the primary computing module 104. In another embodiment, the data repository 106 may comprise a separate computing system. An embodiment wherein the data repository 106 is a part of the primary computing module 104 is described hereafter. FIG. 6 shows a block diagram illustrating an exemplary computing system 600 that includes a primary memory 608 and a secondary memory 610. The data-transfer environment 100 may be used to process data from the data repository 106 of the primary computing module 104 by a software application, or software module stored, e.g., in the primary memory 608 or secondary memory 610 of a computer system 600, of the user module 102. Correspondingly, the data repository 106 may comprise a database which may be stored e.g., in the primary memory 608 or secondary memory 610 of a computer system 600 of the primary computing module 104.

Alternatively, instead of a computer system 600, the software application or software module may also be stored in a cloud-computing environment. As shown in the block diagram of FIG. 5, cloud-computing environment 502 may contain backend platform 508. Cloud-computing environment 502 may be present in an example cloud environment 500 in which systems and/or methods described herein may be implemented. The primary computing module 104 of FIG. 1, described above, may also include a cloud-computing environment 502 in an embodiment. The cloud-computing environment 502 may be accessed by a primary module computing system 504 in FIG. 5. The primary module computing system 504 may be of the same type of computing system 600 as described above. In this case, the primary module computing system 504 of FIG. 5 may access the cloud-computing environment 502 by a communication or network interface 624 as shown in FIG. 6, wherein a network gateway 506 may comprise a remote entity 628 in FIG. 6, accessed by the communications path 626 of the primary computing module system 504.

Figure 5:
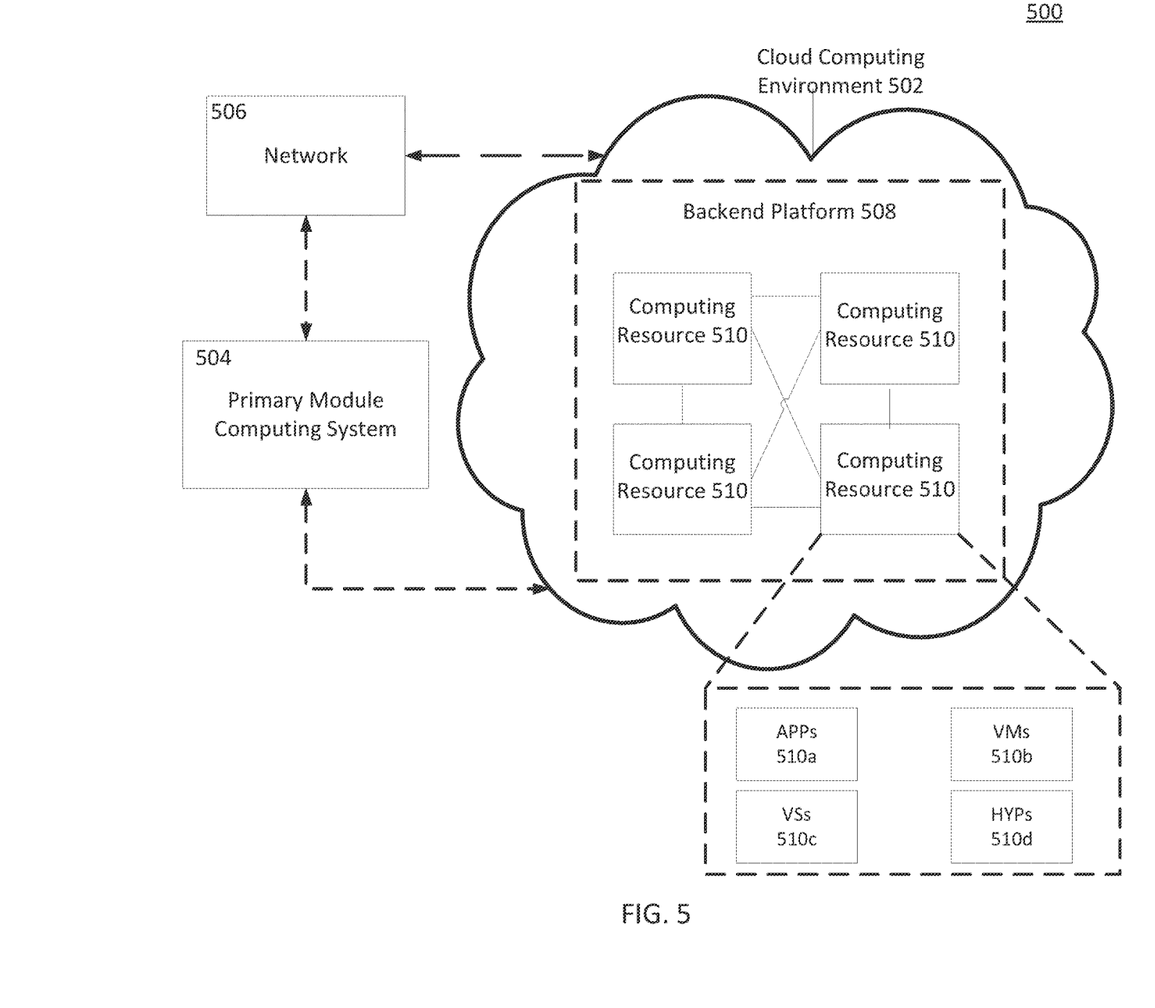
FIG. 5 is a block diagram of an example where a cloud computing environment is accessed by a user computing system, according to an embodiment.

Alternatively, instead of the network gateway 506 comprising a remote entity 628, the cloud-computing environment 502 itself may correspond to a remote entity 628 in FIG. 6. In this case, the cloud environment 502 may be accessed directly by the user computing system 504 through a communications path 626. For example, direct access may occur through an application protocol interface (API), which eliminates the need for a network gateway 506. Both the use of a network gateway 506 and the alternative direct access of cloud environment 502 are shown in FIG. 5. Here, the flow path above the central module computing system 504 uses a network gateway 506, and the flow path below the user computing system 504 connects directly to the cloud computing environment 502. Both options showing flow-paths from computing system 504 are shown in FIG. 5 using dashed bi-directional lines.

Just as the primary computing module 104 may include a cloud-computing environment 502, so too any of the user modules 102, public-facing health check module 410 which will be described later, etc., may also include a host such as a cloud computing environment 502 in an embodiment. In such an embodiment, where one of these entities, e.g. user module 102, includes a cloud computing environment 502, the cloud environment may be accessed by a computing system 504 (of the type of computing system 600), respectively. For example, the user module 102 as shown in FIG. 1 may include a computing system 600, which acts as the respective computing system 504 in FIG. 5, and enables access to the cloud-computing environment 502 as described above. In this manner, because multiple entities may include cloud-computing environments 502, there may be multiple cloud environments 500 present in the system of FIG. 1.

The cloud-computing environment 502 may include computing resources 510. Each computing resource 510 includes one or more personal computers, workstations, computers, server devices, or other types of computation and/or communication devices of the type such as computer system 600 described above.

In an embodiment where the primary computing module 104 includes a computing cloud environment 502, the software application or module may be stored in primary memory 608 and/or secondary memory 610 of computing resources 510. If the software module is stored as part of cloud resources 510, a web application 510a (as shown in FIG. 5), may be deployed. Such an implementation provides a user access to use the software modules, where said application may be accessed from the other modules in FIG. 1. For example, if the web application 510a is deployed running software modules stored as part of the cloud resource 510, then a computer system 600 of the primary computing module 104 may access the software module through the web application 510a.

Figure 4:
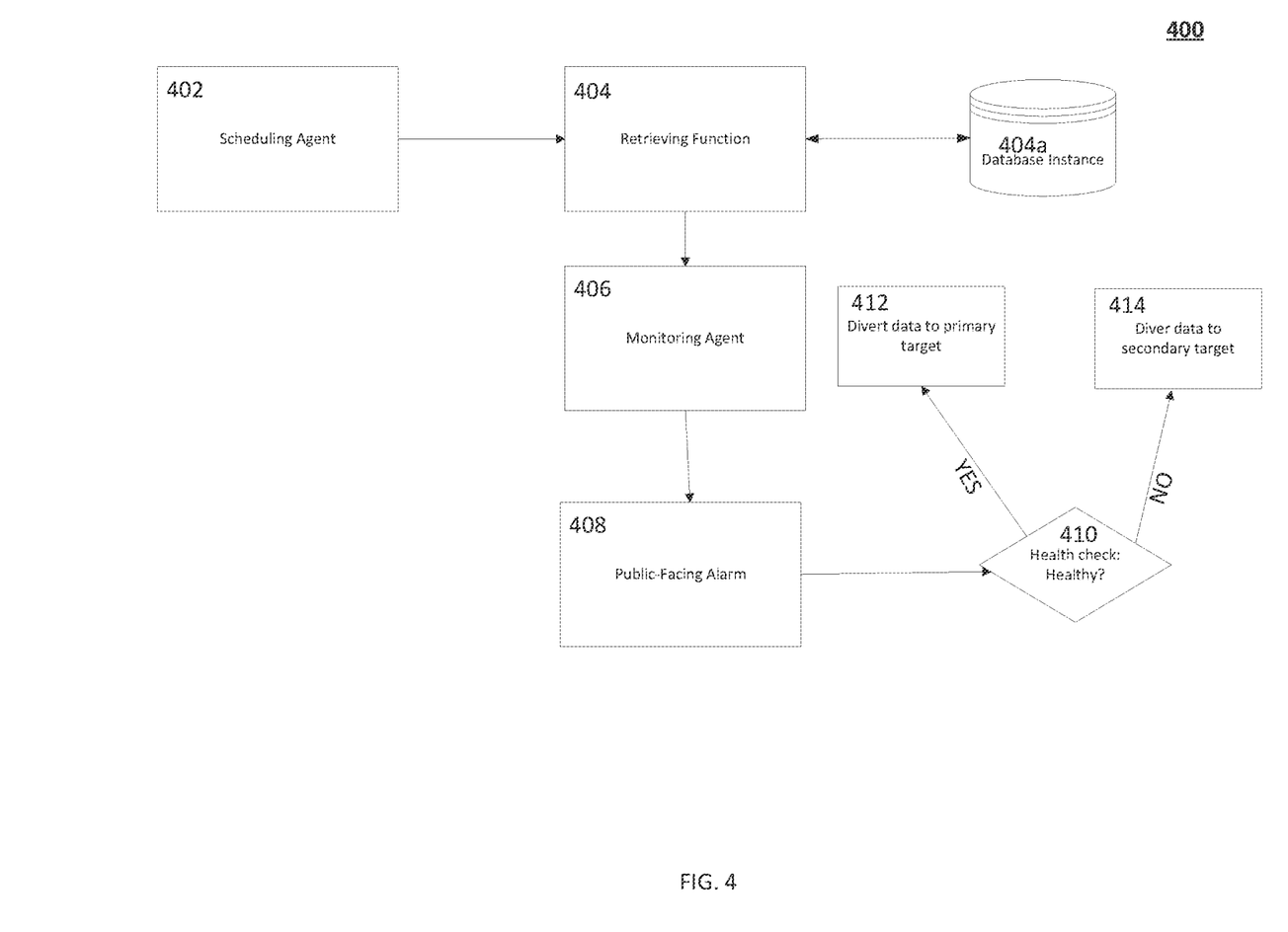
FIG. 4 is a flowchart illustrating the interaction of the different components of the failover process in a passive and reactive prediction mode, according to an embodiment.

In a similar manner, a database of the repository 106 may be stored in primary memory 608 and/or secondary memory 610 of computing resources 510 of a cloud-computing environment 502 included as part of the primary computing module 104. If the database is stored as part of cloud resources 510 in the user module 102, a web application 510a may be deployed giving a user access to use the database. Alternatively, the database may be accessible through an application protocol interface (API). Web application 510a or the API may be stored in the primary 608 and/or secondary memory 610 of computing resources 510 of the cloud environment 500 included as part of the primary computing model. The web application 510a may query a public-facing health check module 410 as shown in FIG. 4. As will be explained later, the public-facing health check module 410 also acts as a domain name server, to determine the address of the database of the data repository 106 to read from (within the cloud-computing network), and then access the database using the API or web application 510a.

Figure 2:
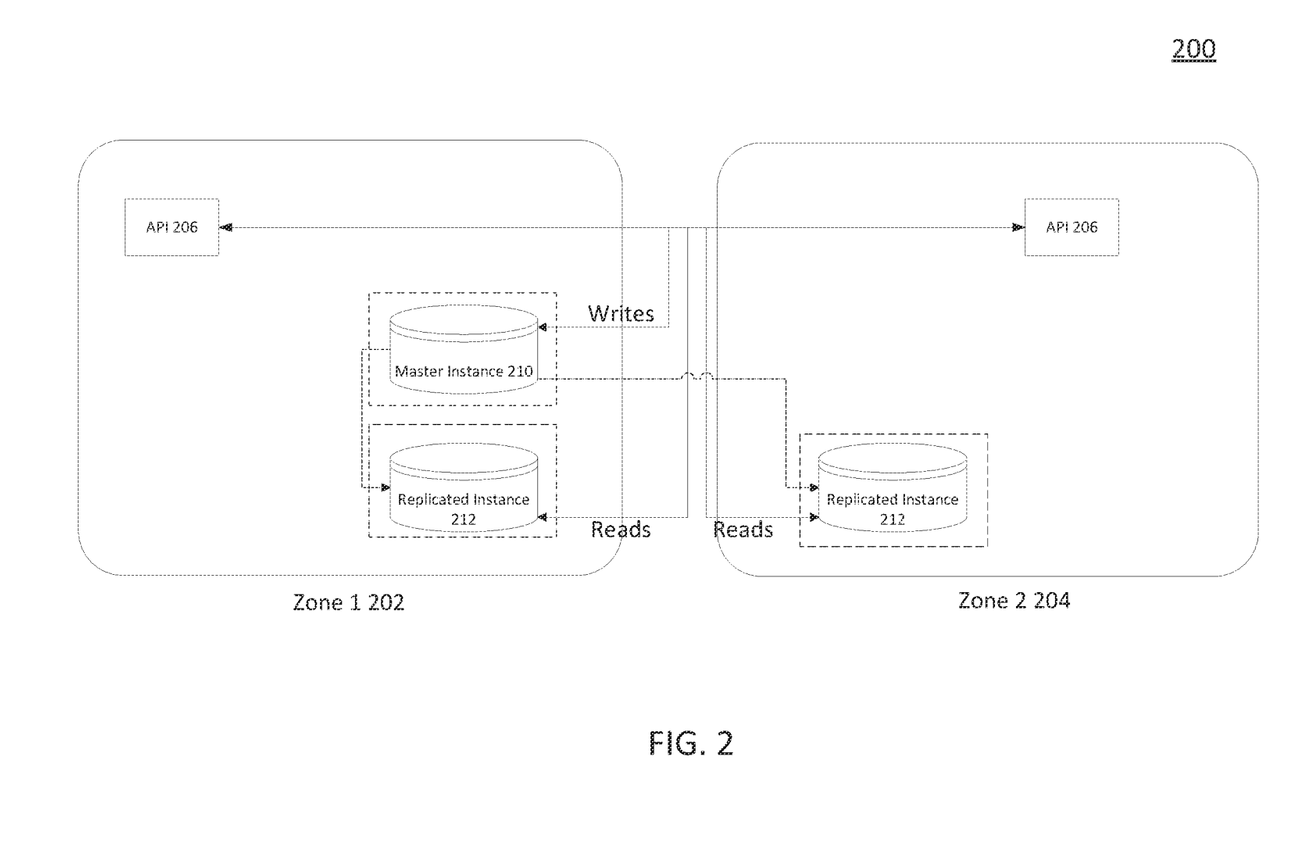
FIG. 2 is a block diagram representing an example embodiment of the geographical zone setup of an application.

FIG. 2 shows an embodiment of the cloud computing environment 502 included as part of the primary computing module 104 in more detail. In particular, cloud resources 510, which may each separately comprise computing systems 600, may be grouped by zone. There may be separate cloud resources 510 running in Zone 1 202, and separate cloud resources 510 running in Zone 2 204. These zones may be separated by various criteria, including, e.g., geographically. These cloud resources across zones may collectively form the backend platform 508 of the cloud-computing environment 502. In the embodiment shown in FIG. 2, there may be a master instance of a database 210 stored within primary and/or secondary memory of computing resources 510 running in zone 1. The database 210 shown in FIG. 2, may correspond, for example, to the database of the data repository 106 of the primary computing module 104 in FIG. 1. The database 210 may be replicated synchronously or asynchronously (at regular or irregular time intervals) to replicated instances 212. Such replication is shown by the dashed lines from master instance 210 to the replicated instances 212 in FIG. 2.

The master instance of the database 210 may be the only instance that is written to, as shown by the solid arrow from the API 206 to the master instance 210 in FIG. 2. An accompanying API 206 for the database is housed in the computing resources of Zone 1, as well as in the computing resources of Zone 2, in an embodiment. This aids in centralizing replication as all updates (e.g., writing or deleting content from the database) are directed to a single source (the master instance 210), and the replicated instances 212 may then be replicated based on the updated master instance 210. Second, this arrangement provides a more secure access paradigm, where reading information from the database may only occur from the API 206 on the replicated instances 212, whether in Zone 1 or Zone 2. Each database instance, including the master instance 210 and the replicated instances 212, have their own sub-geographical zone of availability within Zone 1 202 or Zone 2 204, shown by a dashed box surrounding each respective instance. Finally, having replicated instances increases scalability and read throughput. The replicated instances can only serve read traffic and are therefore faster. They can be provisioned across geographical regions and can also be promoted to a master database instance in case of a disaster. An outage or failure can occur at the database level (database instance failure), at the zone of availability level (availability zone failure), or at the regional level (regional failure of Zone 1 202 or Zone 2 204). Based on such a failure, as will be described below with reference to the failover process of FIG. 3, traffic may be redirected from being read from one database instance to being read by another database instance (e.g. from a designated primary replicated instance 212 in Zone 1 202, to a designated secondary replicated instance 212 in Zone 2 204, in the embodiment shown in FIG. 2). In other embodiments, there may be multiple replicated database instances 212 in Zone 1 202 and Zone 2 204.

Figure 3:
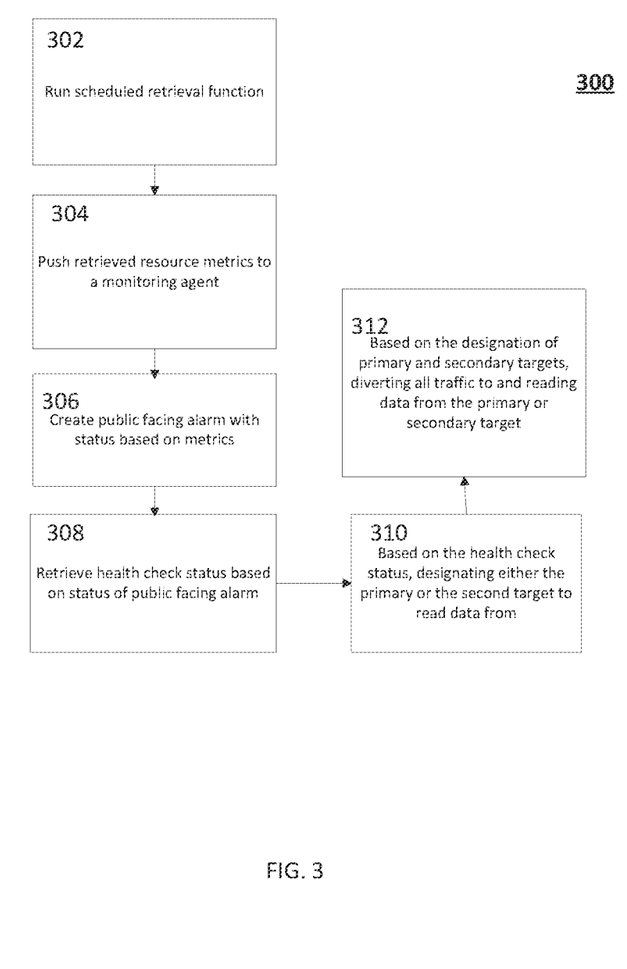
FIG. 3 is a flowchart illustrating a failover process based on a public-facing alarm, according to an embodiment.

The embodiment of FIG. 3 is further explained herein with reference to the structure of FIGS. 4 and 2. FIG. 3 describes an active flow of the automated failover process of an embodiment of the disclosure. The arrangement of the cloud computing environment 502 included as part of the primary computing module 104 is as described above with reference to FIG. 2, and may be adapted as needed for other embodiments. In monitoring network connectivity and outages, a first scheduling agent software module may be used to call a retrieving function.

As shown in FIG. 4, the scheduling agent 402 may be set to invoke a retrieving function 404 based on a regularly set interval (e.g. every 5 minutes, etc.), or may be based on irregularly set intervals, and may instead depend on additional parameters such as free network resources, the CPU load on computing resources 510, amount of free primary/secondary memory in computing resources 510, etc. Alternatively, the timing may be set in a random manner.

At regularly or irregularly set intervals, the scheduling agent 402 invokes the retrieving function 404 and runs the scheduled retrieval function at 302. The retrieving function 404, run at step 302, retrieves a set of reporting metrics from a designated database instance 404a. In an embodiment, each computing resource 510 of the cloud computing environment 502 is either in Zone 1 202 or Zone 2 204. In this embodiment, a computing resource 510, either in Zone 1 202 or Zone 2 204, may host the scheduling agent being run at step 402 at regularly or irregularly set intervals. If the computing resource 510 hosting the scheduling agent is in Zone 1 202, then the designated database instance 404a in FIG. 4 may correspond to the replicated instance 212 in Zone 1 202, as shown in FIG. 2. Further, if the computing resource 510 hosting the scheduling agent is in Zone 1, the replicated instance 212 in Zone 1 202 may be set as a primary target, and the replicated instance 212 in Zone 2 204 can be set as a secondary target by the retrieving function 404, run at step 302. Conversely, if the computing resource 510 hosting the scheduling agent is in Zone 2 204 in FIG. 2, then the designated database instance 404a in FIG. 4 may be the replicated instance 212 in Zone 2 204. In this case, the replicated instance 212 in Zone 2 204 may be further set as a primary target, and the replicated instance 212 in Zone 1 202 can be set as a secondary target by the retrieving function.

The retrieval function 404 opens a new connection, using protocol such as TCP/UDP or the like, to send a packet or plurality of data packets to the corresponding computing resource 510 hosting the designated primary target replicated instance 212, whether in Zone 1 202, or in Zone 2 204. Out of a predetermined number of times, using a new connection for each time, the retrieving function 404 runs a validation query at step 302. Thus a validation query is run for the predetermined number of times and the number of successful validation queries in receiving data back from the designated primary target replicated instance 212 is returned. The predetermined number of times the validation query is run, and the number of times the query is successful, comprises a first portion of the reporting metrics reported by retrieving function 404. In addition to validation queries retrieving data from the database of the designated primary target replicated instance 212, the retrieving function 404 may also monitor the network connectivity of the private subnet of the designated primary target replicated instance 212 of the database of the data repository 106. The private subnet for each respective designated primary target replicated instance 212, as well as for master instance 210, includes appropriate computing resource or resources 510 storing the database. Statistics for zonal (zone of availability) or regional outages, are retrieved in combination with the reported database information. It is understood that when a computing resource 510 is referred to as storing a database, that this may also be referring to a plurality of computing resources 510 that share primary or secondary memory resources, as will be explained below. This information about zonal or regional outages forms a second part of the reporting metrics for the retrieving function 404.

The scheduling agent 402 and retrieving function 404 may be software modules that are stored in primary memory 608 and/or secondary memory 610 of computing resources 510. The software modules may be present on computing resources 510 of the cloud-computing environment 502, which are not public facing—thus, being part of a private subnet that has no direct routes to an internet gateway, etc. Instead, for such a private subnet, computing resources 510 may access the internet by using a network address translation (NAT) gateway that resides in the public subnet. In this manner, in a one-way mode of communication, database servers can connect to the Internet for pushing data from the database servers, but the Internet cannot establish connections to the database servers.

Through such a one-way mode of communication, data including the first and second part of the reporting metrics of the appropriate retrieving function 404 can be pushed from the computing resources 510 of a private subnet to a public facing module accessible to the Internet. This holds true for both cases, where the computing resources 510 may correspond to a scheduling agent 402 and associated retrieving function 404 in Zone 1, or where the computing resources 510 may correspond to a scheduling agent 402 and associated retrieving function 404 in Zone 2. In this arrangement, Zone 1 and Zone 2 may comprise separate private subnets within the same cloud-computing environment 502. In another embodiment Zone 1 and Zone 2, although they may be split by geographical region, may be part of the same private subnet within the same cloud computing environment 502.

The reporting metrics may be pushed using the mode of one-way communication described above, from retrieving function 404 to a public-facing monitoring agent 406 of FIG. 4 at step 304 in the process shown in FIG. 3. This may occur after the retrieving function 404 is initially invoked by the scheduling agent 402 at step 302, and gathers retrieved resource metrics. The pushing of the metrics at step 304 may occur every time the resource metrics are gathered, or at regular/irregular intervals relative to the gathering of the resource metrics. The monitoring agent 406 may comprise a software module in the primary memory 608 and/or secondary memory 610 of a computing resource 510 or computing resources 510. This is a part of a public subnet of computing resources 510, separate from the private subnets described above within the cloud-computing environment 502. Next, based on the metrics pushed to and received by the monitoring agent at step 304 in the process shown in FIG. 3, at step 306, a public-facing alarm 408 shown in FIG. 4 is created.

This creating of the alarm in step 306 publicly stores a status based on the metrics received. The status indicates whether the connection with the designated database 404a by the retrieving function 404 in step 302 of FIG. 3 is okay (status is 'OK'), or whether either the database, zone of availability, or region, cannot be reached (status is 'FAIL).

For manifesting the status in step 306 as 'OK' or 'FAIL' based on the first part of the reported metrics from 302 pushed to the monitoring agent in step 304, the monitoring agent 306 may be preset with a criteria. Such a criteria, may include, for example a threshold predetermined number of connections or higher having a successful validation query for the status to be 'OK.' That is, if a total number of connections to the designated database is attempted by the retrieving function 404 (e.g., 15), then a threshold predetermined number of connections or higher (e.g. 5 or more) must have had a successful validation query (sufficient level of return of data packets from the designated database in step 302). If a threshold number of connections do have successful validation queries, then the status of the public-facing alarm 408 in step 306 is 'OK', or remains as 'OK' if it was already 'OK,' since step 302 may be performed periodically. Conversely, if the number of connections having a successful validation query falls below this predetermined number threshold, then the status of the public-facing alarm 408 may be set to 'FAIL.' Such a threshold may also be in other various reported forms, such as a ratio or percentage of successful validation queries to total validation queries performed. For the second part of the reported metrics, if there is a regional or zonal outage detected that has been pushed to the monitoring agent 406, then the status of the public-facing alarm 408 is set as 'FAIL.'

Any regional or zonal outage is based on the zone of availability of the designated database instance, or region of the designated database instance shown in FIG. 2 and described above, respectively. If there is no such reported regional or zonal outage, and the status based on the first part of the reported metrics is 'OK,' then the status of public-facing alarm 408 remains as 'OK'. The public-facing alarm may comprise a software module in the primary memory 608 and/or secondary memory 610 of a computing resource 510 or computing resources 510, which may be part of a public subnet of computing resources 510, separate from the private subnets described above within the cloud computing environment 502.

In this manner, a clear segregation of private subnet components and public facing components is achieved. This is important for the administrator of business applications, especially if highly sensitive and confidential data is kept in the replicated database instances 212. By assessing metrics through entities only present within the private subnet, the administrator is preventing attacks from the Internet, and limiting probes to the database to coming from a limited number of controllable components. By only pushing what metrics are needed toward the outside (from retrieving function 404 to the monitoring agent 406), the administrator can limit exposure of proprietary and important information to external entities.

By modularizing the reported metrics in this manner and pushing them to the monitoring agent 406, the business administrator also provides for safety in third party checking of the metrics. For example, different third party facing services may provide public-facing metric monitoring components. These components can help a business administrator provide assessments to third parties without revealing further confidential or sensitive information in assessing whether action needs to be taken based on the metrics. In using these public third party facing services, it is important to maintain a high-level of security, and by segregating the private subnet from external entities in the manner described above, this high-level of security is able to be maintained in the cloud computing environment 502 of the primary computing module 104.

Based on the public-facing alarm 408, which is in turn based on the metrics retrieved from the retrieving function 404 running on the designated database instance 404a, the status ('OK' or 'ALARM') is conveyed to another public-facing module, health check 410. The public-facing health check module 410 may comprise a software module in the primary memory 608 and/or secondary memory 610 of a computing resource 510 or computing resources 510. This public-facing health check module 410 may be part of a public subnet of computing resources 510, separate from the private subnets described above within the cloud computing environment 502. Alternatively, in an embodiment, the public-facing health check module 410 may be part of a separate public-facing external cloud computing network 502. It may be in the primary memory 608 and/or secondary memory 610 of a computing resource 510 of such an external network. The alternative embodiment is described hereafter, but the same following description can be adapted for use if the module 410 is part of a public subnet within the cloud computing environment included as part of the primary computing module 104.

Based on the status of the public-facing alarm 408 and the results conveyed from said alarm 408 to the public-facing health check module 410, the status of the public-facing health check module can be retrieved in step 308 of the process shown in FIG. 3. For example, if the status of the public-facing alarm 408 is 'OK', then the status of the public-facing health check module may be set to 'HEALTHY.' Conversely, if the status of the public-facing alarm 408 is 'FAIL', then the status of the public-facing health check module may be set to 'UNHEALTHY.' This status indicates whether the designated database 404a, zone of the designated database, and region of the designated database are all performing at a sufficient level as per the metrics relayed from the retrieving function 404. An 'UNHEALTHY' status indicates that at least one of the database, zone of the designated database, or region of the designated database is experiencing an outage or failure, and therefore data should be re-routed to a different database instance.

Based further on the status of the public-facing health check module, in step 310 of the process shown in FIG. 3, depending upon the status being 'HEALTHY' or 'UNHEALTHY', either a primary or secondary target can be designated to read data from. The primary and secondary targets may be passed from the retrieving function 404 to the monitoring agent 406, from the monitoring agent 406 to the public-facing alarm 408, and from the public-facing alarm 408 to the public-facing health check module 410. Thus, in step 310, if the status of the public-facing health check module 310 is 'HEALTHY,' then the primary target can be designated as the replicated database instance 212 to read data from. If the status of the public-facing health check module 310 is 'UNHEALTHY,' then a failover may be performed. In this scenario, the inward traffic to the user module 102 in FIG. 1 may be diverted, and the secondary target can be designated as the replicated database instance 212 for the user module 102 to read data from. This process will be explained in detail below.

The public-facing health check module 410 may contain further functionality to safely perform a failover based on the health check status and designation of primary or secondary target to read data from in step 312 of the process shown in FIG. 3. In particular, the public-facing health check module 410 may through DNS change propagation, re-route queries from an application being run on the user module 102 in FIG. 1 to the primary computing module 104 for reading data from the database of the data repository 106. Such rerouting may occur from one geographical zone to another geographical zone (e.g. from Zone 1 to Zone 2 in FIG. 2) based on the health check status and previous DNS address. For example, the replicated instance 212 in Zone 1 may have been designated previously as the primary target before the process in FIG. 3 occurs. That is, before the process of FIG. 3, application queries from user module 102 for reading from the database of the data repository 106 were previously being routed to the replicated instance 212 in Zone 1 202. Then, when the process of FIG. 3 occurs, as explained above, if the health check status in step 310 is returned as 'UNHEALTHY,' then the public-facing health check module 410 would perform a failover. In performing the failover, the public-facing health check module 410 may through DNS change propagation re-route queries for reading from the database of the data repository 106 to the secondary replicated instance designated as the secondary target before the process in FIG. 3 occurs. That is the public-facing health check module 410 may re-route queries to the secondary replicated instance 212 in Zone 2 204.

Conversely, in another example application queries for reading from the database of the data repository 106 may have been previously being routed to the replicated instance 212 in Zone 2 204 before the process of FIG. 3 occurs. In this case the replicated instance 212 in Zone 1 202 may be set as the primary target. In this case, when the process of FIG. 3 occurs, if the health check status returned is 'HEALTHY,' then the public-facing health check module 410 would perform a reverse failover. In performing the reverse failover, the public-facing health check module 410 may, through DNS change propagation, re-route queries for reading from the database of the data repository 106 to the replicated instance 212 in Zone 1 202. In this manner, in both of the examples illustrated above, depending on the health check status of health check module 410 and the previous mode of routing, the failover functionality may or may not change the DNS address for accessing the database of the database repository 106 from a replicated instance 212.

In addition to automating the failover, when the failover is performed and the DNS address is changed, it may take time for the DNS service to propagate the changes made for re-routing (e.g. name servers must be contacted in the cloud computing network which the public-facing health check module 410 is part of, etc.). The duration of the time frame for the DNS service to propagate may be, e.g. 60-120 seconds. In this time frame, there is a chance that an application running on user module 102 may not get the updated value of a replicated database instance 212 if an access request is made in this time frame. That is, an application such as the one running on user module 102 may submit an access query to access the database of the repository 106 with reference to the embodiment of FIG. 1. After submitting such an access query, the application may then not get the updated value of the proper replicated database instance 212 to use, if the query is made during the DNS propagation time frame. Consequently, if the application does not get the updated DNS address of the replicated database instance 212, this may lead to unexpected circumstances like connecting to an IP address which does not exist. Further errors may occur as a result. To prevent this scenario from occurring, there may be a fail-safe built into the failover process through the accessing API.

In the API mentioned above as part of the primary computing module 104, the API may send a read request to the DNS address of the replicated database instance 212 (the database in data repository 106) from which the application in user module 102 is trying to read. There is a chance that the application may receive errors because of DNS changes not having propagated, during the DNS propagation timeframe mentioned above. In an example, the replicated database instance 212 of Zone 1 may be designated as the primary target and may be in an 'UNHEALTHY' state. In this example, the public-facing health check module 410 may be performing step 312 of the process shown in FIG. 3 (during, e.g., the 60-120 second timeframe mentioned above), and the DNS address of the database in the repository 106 to be read from may still set be replicated instance 212 of Zone 1, where Zone 1 may be non-responsive. In this case, a circuit breaker logic is implemented. That is, an error would occur when the API tries to send a read request to the replicated database instance 212 in Zone 1. Then, instead of propagating this error back to the user module 102, the API may try to send a subsequent duplicate read request to the replicated database instance 212 in Zone 2 (e.g. if the replicated database 212 in Zone 1 returns an error when attempted to be accessed by the API, then a read request may be sent to the replicated database 212 in the other zone, Zone 2, as an API check on whether DNS propagation error may be occurring). This takes advantage of the replicated database structure set up across different zones, as shown in FIG. 2, wherein the structure of all replicated database instances 212 has the same structure, and would respond in a similar manner to a read request. In this manner, a zero-downtime outcome is achieved, and DNS changes may be propagated smoothly, to ensure an efficient customer experience.

Finally, further, embodiments are also envisioned with additional geographical zones, as well as additional replicated database instances 212 within the same zone. For an embodiment with multiple zones more than the two shown in FIG. 2, to implement similar circuit-breaker logic to the scenario described above, the API may try every zone and send read requests to multiple replicated database instances 212.

To designate a primary target within a geographical zone, machine learning may be used. For example, a support vector machine (SVM), random-forest, K means clustering, multi-layer neural network with back-propagation, or other algorithm may be used with several associating factors to designate the replicated database instance 212 which would be most efficient for customer application use.

One example of training is the SVM, where features having the smallest weights are removed and the algorithm is re-trained with the remaining weights, wherein said process is repeated until features remain that are able to accurately separate the data into different patterns or classes. In this manner, a multi-dimensional separating hyperplane may be constructed. Alternately, a neural network type algorithm is used, such as a back-propagation neural network, where there may be a weight matrix for each layer of the neural network, wherein for each layer a bias vector is defined. The model may first undergo forward propagation. In forward propagation the input signals may be multiplied by the weights in the weight matrices for each layer, and activation functions may transform the output at each layer, wherein the end output may be calculated. Back propagation aids in computing the error of partial derivatives, which can then be minimized across layers, and can form the central mechanism by which the neural network learns. This may aid in discovering trends for classification wherein resources of a particular input may be more likely to be used.

In this manner, the machine-learning based monitoring system could monitor several input variables at once, as described above, for various classification schemes. Several of these decision-making structures may be used in parallel to give different populations of results. For example, associating factors used as input variables may include CPU load of the computing resources 510 upon which corresponding replicated database instances 212 may be hosted. In this case, as an example, certain computers or other computing resources 510 hosting the replicated database instances 212, which are originally designated as primary targets, may tend to have a higher load than other computing resources 510 hosting other replicated instances 212. In this case, the machine learning algorithm, taking cognizance of the heavier load on the primary targets through its learning paradigm, using the failover technique described above, may switch to a secondary target from a primary target. The algorithm could then divert database access queries from applications such as those in user module 102 to replicated database instances 212 hosted by computing resources 510 with a lower load.

Furthermore, even within a zone, as described above, each replicated instance 212 of the master instance 210 of the database in the data repository 106 has its own zone of availability. This may be a geographical zone as well. In such a case, an associating factor may be the incorporating of weather forecasts, where such a prediction model may be used to determine in which geographical zone, or in which zones of availability for replicated instances 212 within a geographical zone, an outage may be expected. In this case, to avoid such an outage, traffic may be diverted beforehand by such a machine-learning algorithm, using the automated failover technique described above, to switch to a secondary target from a primary target. The algorithm could then divert database queries to a replicated instance 212 that would safely avoid such weather. In this way an outage can be avoided. Additional embodiments and sub-combinations can be made in this manner.

The method 300, as applied to FIG. 1, may utilize the structure of the components in FIG. 4 and the arrangement of FIG. 2. Further the components in these figures may have an underlying structure of a computing system 600 of FIG. 5 and the environment 500 of FIG. 5. An interaction of such a computing system 600 with a cloud computing environment 502, will be described hereafter.

The underlying structure of a computer system 600, shown in FIG. 6, can implement a database included in the repository 106, and the sending and receiving of data. Such a computer system 600, may, according to the embodiments describe above, be included as part the user module 102, primary computing module 104, etc. Computer system 600 may include one or more processors (also called central processing units, or CPUs), such as a processor 604. Processor 604 may be connected to a communication infrastructure or bus 606.

Computer system 600 may be virtualized, or it may also include user input/output devices 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process read requests for table data received from the replicated database instance 212 which read requests are directed to by the public-facing health check module 410 when data is to be processed in a mass quantity, making it particularly effective in resource-intensive applications. The GPU may have a parallel structure that is efficient for parallel processing of large blocks of data, such as mathematically intensive data common to the machine-learning algorithms described above when evaluating large blocks of data for associating factors associated with the replicated instances 212, computer graphics applications, images, videos, word-processing documents, PDF files. In addition, data analyzed by the GPU can also include table data received from database instance 212 as described above.

Computer system 600 can also include a main or primary memory 608, such as random-access memory (RAM). Main memory 608 can include one or more levels of cache (including secondary cache).

Computer system 600 can also include one or more secondary storage devices or memory 610. Secondary memory 610 may include, for example, a hard disk drive 612 and/or a removable storage device or drive 614, which may interact with a Raid array 616, which may combine multiple physical hard disk drive components (such as SSD or SATA-based disk drives) into one or more logical units, or a removable storage unit 618. Removable storage unit 618 may include a computer usable or readable storage device having stored thereon computer software (control logic) and/or data, including remotely accessed network drives. Removable storage unit 618 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote entities 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the replicated database instance 212 through the API of primary computing module 104 to the user module 102). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Computer system 600 may be a client or server, accessing or hosting any applications and/or data through any delivery paradigm, including but not limited to remote or distributed cloud computing solutions such as cloud computing environment 502 which will be explained below; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the database of the repository 106, as an example approach, for storing and accessing its constituent data objects, the computer system 600 may use an in-memory database with persistence, which may store and access data objects from the primary memory 608 of the computer system 600 with a transaction log for persistence being stored in secondary memory 610. Alternately, the computer system 600 may use secondary memory 610 entirely to store the repository, or may implement a more frequently accessed portion of the data objects in an in the primary memory 608, and a less frequently accessed portion of the data objects in secondary memory 610.

The devices of the environments 500, 600, and 100 may be connected through wired connections, wireless connections, or a combination of wired and wireless connections. In an example embodiment, one or more portions of the data transfer environment 100 or example cloud environment 500 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing resource(s) 510 may host the backend platform 508. The cloud computing resources may include compute instances executing in the cloud computing resources 510. The cloud computing resources 510 may communicate with other cloud computing resources 510 via wired connections, wireless connections, or a combination of wired or wireless connections.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
replicating, by at least one computing processor, a first instance of a data repository corresponding to a first computing resource target to generate a second instance of the repository corresponding to a second computing resource target;
retrieving, by the at least one computer processor, via an application programming interface (API), a plurality of resource metrics from the first computing resource target;
creating, by the at least one computer processor, an alarm with a status based on the metrics;
retrieving, by the at least one computer processor, a health check status from a cloud computing network based on the status of the alarm;
based on the retrieved health check status transmitting, by the at least one computer processor, a read request to read data from the first instance of the data repository of the first computing target resource; and
in response to the API encountering an error when reading the data:
determining, by the at least one computer processor, the read request has a status of not failed; and
in response to the determination, sending, by the at least one computer processor, a duplicate read request to the second instance of the data repository of the second computing resource target.

2. The computer-implemented method of claim 1, wherein the health check status indicates a status of the first computing resource target as either healthy or unhealthy and the method further comprising:
reading the data, via the API, by the at least one computer processor, from the first instance of the data repository in the first computing resource target, when the status of the first computing resource target is healthy; and
reading the data, via the API, by the at least one computer processor, from the second instance of the data repository in the second computing resource target, when the status of the first computing resource target is unhealthy.

3. The computer-implemented method of claim 1, wherein the plurality of resource metrics includes a percentage of successful attempts to access a database on the first computing resource target and the method further comprising:
setting, by the at least one computer processor, the alarm to an OK state where the database is able to be accessed a threshold percentage or higher; and
setting, by the at least one computer processor, the alarm to a FAIL state when the database is not able to be accessed a threshold percentage or higher.

4. The computer-implemented method of claim 1, wherein the first and second computing resource targets are in different geographical regions.

5. The computer-implemented method of claim 4, wherein the plurality of resource metrics includes statistics of outages associated with a geographical region of the first computing resource target.

6. The computer-implemented method of claim 1, wherein retrieving the plurality of resource metrics is scheduled to occur at regular intervals of time.

7. The computer-implemented method of claim 1, wherein when retrieving the plurality of resource metrics executing, by the at least one computer processor, a validation query on the first instance of the data repository a predetermined number of times.

8. A system comprising:
a memory; and
a processor coupled to the memory, wherein the processor is configured to:
replicate a first instance of a data repository corresponding to a first computing resource target to generate a second instance of the repository corresponding to a second computing resource target;
retrieve via an application programming interface (API), a plurality of resource metrics from the first computing resource target;
create an alarm with a status based on the metrics;
retrieve a health check status from a cloud computing network based on the status of the alarm;
based on the retrieved health check status transmit a read request to read data from the first instance of the data repository of the first computing target resource; and
in response to the API encountering an error when reading the data:
determine the read request has a status of not failed; and
in response to the determination, send a duplicate read request to the second instance of the data repository of the second computing resource target.

9. The system of claim 8, wherein the health check status indicates a status of the first computing resource target as either healthy or unhealthy, and the processor further configured to:
read the data, via the API, by the processor, from the first instance of the data repository in the first computing resource target, when the status of the first computing resource target is healthy; and
read the data, via the API, by the processor, from the second instance of the data repository in the second computing resource target, when the status of the first computing resource target is unhealthy.

10. The system of claim 9, wherein when retrieving the plurality of resource metrics the processor is further configured to execute a validation query on the first instance of the data repository a predetermined number of times.

11. The system of claim 8, wherein the plurality of resource metrics includes a percentage of successful attempts to access a database on the first computing resource target, and the processor is further configured to:
set the alarm to an OK state where the database is able to be accessed a threshold percentage or higher; and
set the alarm to a FAIL state when the database is not able to be accessed a threshold percentage or higher.

12. The system of claim 8, wherein the first and second computing resource targets are in different geographical regions.

13. The system of claim 12, wherein the plurality of resource metrics includes statistics of outages associated with a geographical region of the first computing resource target.

14. The system of claim 8, wherein retrieving the plurality of resource metrics is scheduled to occur at regular intervals of time.

15. A non-transitory computer-readable medium having instructions stored thereon that, when executed by at least one computing device, cause the at least one computing device to perform operations comprising:
replicate a first instance of a data repository corresponding to a first computing resource target to generate a second instance of the repository corresponding to a second computing resource target;

retrieve via an application programming interface (API), a plurality of resource metrics from the first computing resource target;

create an alarm with a status based on the metrics;

retrieve a health check status from a cloud computing network based on the status of the alarm;

based on the retrieved health check status transmit a read request to read data from the first instance of the data repository of the first computing target resource; and in response to the API encountering an error when reading the data:
  determine the read request has a status of not failed; and
  in response to the determination, send a duplicate read request to the second instance of the data repository of the second computing resource target.

16. The non-transitory computer-readable medium of claim 15, wherein the health check status indicates a status of the first computing resource target as either healthy or unhealthy and the operations further comprise:
  reading the data, via the API, by the at least one computing device, from the first instance of the data repository in the first computing resource target, when the status of the first computing resource target is healthy; and
  reading the data, via the API, by the at least one computing device, from the second instance of the data repository in the second computing resource target, when the status of the first computing resource target is unhealthy.

17. The non-transitory computer-readable medium of claim 15, wherein the plurality of resource metrics includes a percentage of successful attempts to access a database on the first computing resource target and the operations further comprise:
  setting the alarm to an OK state where the database is able to be accessed a threshold percentage or higher; and
  setting the alarm to a FAIL state when the database is not able to be accessed a threshold percentage or higher.

18. The non-transitory computer-readable medium of claim 15, wherein the first and second computing resource targets are in different geographical regions.

19. The non-transitory computer-readable medium of claim 18, wherein the plurality of resource metrics includes statistics of outages associated with a geographical region of the first computing resource target.

20. The non-transitory computer-readable medium of claim 15, wherein retrieving the plurality of resource metrics is scheduled to occur at regular intervals of time.

* * * * *